United States Patent
Goupil et al.

(10) Patent No.: US 9,776,729 B2
(45) Date of Patent: Oct. 3, 2017

(54) METHOD AND SYSTEM FOR AUTOMATICALLY ESTIMATING AT LEAST ONE SPEED OF AN AIRCRAFT

(71) Applicant: Airbus Operations (S.A.S.), Toulouse (FR)

(72) Inventors: Philippe Goupil, Beaupuy (FR); Nicola Mimmo, San Severo (IT); Pierre Chevalier, Toulouse (FR); Daniel Lopez Fernandez, Blagnac (FR); Rémy Dayre, Pibrac (FR)

(73) Assignee: Airbus Operations (S.A.S.), Toulouse (FR)

( * ) Notice: Subject to any disclaimer, the term of this patent is extended or adjusted under 35 U.S.C. 154(b) by 28 days.

(21) Appl. No.: 14/886,727

(22) Filed: Oct. 19, 2015

(65) Prior Publication Data
US 2016/0107762 A1 Apr. 21, 2016

(30) Foreign Application Priority Data
Oct. 20, 2014 (FR) .................................... 14 60067

(51) Int. Cl.
*B64D 43/02* (2006.01)
*G01P 5/14* (2006.01)
(Continued)

(52) U.S. Cl.
CPC ............... *B64D 43/02* (2013.01); *G01P 5/02* (2013.01); *G01P 5/14* (2013.01); *G01P 21/025* (2013.01)

(58) Field of Classification Search
CPC ......... B64C 13/00; B64C 17/00; B64D 43/02; G01P 21/025; G01P 5/02; G01P 5/14
(Continued)

(56) References Cited

U.S. PATENT DOCUMENTS 2,853,256 A * 9/1958 Schmidt .................. B64C 13/24
244/82
5,078,338 A * 1/1992 O'Neill ..................... B64C 3/42
244/46
(Continued)

FOREIGN PATENT DOCUMENTS

DE 10 2013 101351 A1 8/2014

OTHER PUBLICATIONS

Annaz F: "Monitoring in torque-summled electromechanical actuators", Mechatronics and Its Applications, 2008. ISMA 2008. 5th International Symposium on, IEEE, Piscataway, NJ, USA, May 27, 2008 (May 27, 2008), pp. 1-6, XP031346492, ISBN: 978-1-4244-2033-9 * Point 6.2*.
(Continued)

*Primary Examiner* — Dalena Tran
(74) *Attorney, Agent, or Firm* — Jenkins, Wilson, Taylor & Hunt, P.A.

(57) ABSTRACT

A device including a first data generating unit for determining at least one aerodynamic hinge moment of at least one control surface of the aircraft, a second data generating unit for determining a plurality of data and at least one external static pressure and a model of hinge moment coefficient, a computation unit for computing with the aid of these data at least one speed of the aircraft, namely a Mach number and/or a conventional speed, and a data transmission unit for providing this speed to a user system.

16 Claims, 3 Drawing Sheets

(51) Int. Cl.
  *G01P 5/02* (2006.01)
  *G01P 21/02* (2006.01)
(58) Field of Classification Search
  USPC .................................. 701/3; 244/90 B, 99.11
  See application file for complete search history.

(56) References Cited

U.S. PATENT DOCUMENTS

| 5,099,245 A | * | 3/1992 | Sagey | ........................ | G01S 5/06 |
| | | | | | 342/357.2 |
| 8,374,804 B2 | | 2/2013 | Hickman | | |
| 2014/0229139 A1 | | 8/2014 | Hegenbart et al. | | |

OTHER PUBLICATIONS

Chunxiang Sun et al: "Analysis of rudder characteristics of spin missile", Electrical and Control Engineering 2011 International Conference on, IEEE, Sep. 16, 2011 (Sep. 16, 2011), pp. 4729-4732, XP031960267, DOI: 0.1109/ICECENG.2011.6057655 ISBN: 978-1-4244-8162-0 *Point II.*
Ganguli Suvo: "Airspeed estimation usingg servo current and aircraft model", 2013 IEEE/AIAA 32nd Digital Avionics Systems Conference (DASC), IEEE, Oct. 5, 2013 (Oct. 5, 2013), XP032553365, ISSN: 2155-7195, DOI:10.1109/DASC.2013.6712592 [extrait le Jan. 14, 2014] * Points 1.0, 4.0*.

* cited by examiner

METHOD AND SYSTEM FOR AUTOMATICALLY ESTIMATING AT LEAST ONE SPEED OF AN AIRCRAFT

CROSS-REFERENCE TO RELATED APPLICATION

This application claims priority to French Patent Application FR 14 60067 filed Oct. 20, 2014, the entire disclosure of which is incorporated by reference herein.

TECHNICAL FIELD

The present disclosure relates to a method and a device for automatically estimating, in real time, at least one speed of an aircraft, in particular of a transport airplane.

BACKGROUND

It is known that, in a standard manner, to determine the speed of the aircraft during a flight, in particular a Mach number or a conventional speed or corrected speed of CAS (for "Calibrated Air Speed") type, measurements are carried out of the total air pressure (with the aid of Pitot probes) and of the static air pressure (with the aid of dedicated sensors), and the speed is computed with the aid of standard formulae using these measurements.

Such a computation therefore requires the measurement of the total air pressure. Hence, if it is desired to dispense with the use of sensors (total air pressure sensors or Pitot probes) in order to save weight and costs and to decrease the complexity of the processing chain, this standard solution is no longer able to determine the air speed of the aircraft.

SUMMARY

The present disclosure relates to a method for automatically estimating at least one speed of an aircraft, without using the measurement of total pressure, during a flight of the aircraft.

According to the disclosure herein, the method comprises steps, in an automatic manner and on the aircraft, of:
a) determining at least one aerodynamic hinge moment of at least one control surface of the aircraft;
b) determining a plurality of data and at least the following data:
   a static pressure external to the aircraft; and
   a model of hinge moment coefficient;
c) computing a Mach number M representing a first speed of the aircraft, with the aid of the following expression:

$$M_a = \frac{1}{2}\gamma P_s M^2 V_{\delta_p} C_h$$

in which:
   $M_a$ is the aerodynamic hinge moment;
   $\gamma$ is an adiabatic coefficient of the air;
   $P_s$ is an external static pressure;
   $V_{\delta_p}$ represents a volume of the control surface; and
   $C_h$ is the model of aerodynamic hinge moment coefficient of the control surface, dependent on the Mach number M; and
d) in providing the first speed thus computed to at least one user system.

Thus, by virtue of the disclosure herein, the speed of the aircraft is estimated automatically, in real time, on the basis of the value of at least one aerodynamic hinge moment of at least one control surface of the aircraft, without using any measurement of the total air pressure, thereby making it possible to dispense with the associated sensors, generally redundant on civil airplanes.

This aerodynamic hinge moment illustrates the aerodynamic forces acting on the control surface of the aircraft in the course of the flight. These forces depend on the speed of the aircraft, and also on a plurality of other parameters, such as for example the aerodynamic configuration, the attitude of the aircraft, the flight altitude, etc.

In a first preferred embodiment, step a) comprises sub-steps of:
   measuring at least one pressure difference between two hydraulic chambers of at least one actuator intended to generate the deflection of the control surface; and
   computing the aerodynamic hinge moment, with the aid at least of this pressure difference.

Furthermore, in a second embodiment, step a) comprises a sub-step of directly measuring the aerodynamic hinge moment on the control surface.

Moreover, in a first variant embodiment, to compute the Mach number, step c) uses a model inversion, for the model of the aerodynamic hinge moment. Preferably, step c) implements a least squares scheme.

Furthermore, in a second variant embodiment, to compute the Mach number, step c) uses a non-invertible function, for the model of the aerodynamic hinge moment. Preferably, step c) implements one of the following schemes:
   a scheme using a so-called "Least-Squares Sliding-Mode" observer;
   a scheme using a so-called "Least-Squares Luenberger" observer;
   a scheme using a so-called "High Order Sliding-Mode" observer.

Moreover, in an advantageous manner, step b) comprises also determining at least some of the following data which are used in step c) to compute the Mach number:
   at least one aerodynamic angle of the aircraft (for example, the angle of attack);
   at least one angle of deflection of the control surface;
   at least one load factor exerted on the control surface;
   the aerodynamic configuration of the aircraft; and
   at least one angular velocity of the aircraft.

Furthermore, in a particular embodiment, step a) consists in or comprises determining aerodynamic hinge moments of a plurality of different control surfaces of the aircraft, and step c) consists in or comprises computing the Mach number with the aid of the aerodynamic hinge moments relating to this plurality of control surfaces.

Moreover, in a particular embodiment, the method comprises an additional step, posterior to step c) and consisting in or comprising computing a conventional speed (or corrected speed) CAS, representing a second speed of the aircraft, on the basis of the Mach number computed in step c) and of additional data.

The present disclosure also relates to a device for automatically estimating at least one speed of an aircraft, during a flight of the aircraft.

According to the disclosure herein, the device comprises:
   a first data generating unit configured to determine at least one aerodynamic hinge moment of at least one control surface of the aircraft;
   a second data generating unit configured to determine a plurality of data and at least the following data:
      a static pressure external to the aircraft; and
      a model of hinge moment coefficient;

a computation unit configured to compute a Mach number M representing a first speed of the aircraft, with the aid of the following expression:

$$M_a = \frac{1}{2}\gamma P_s M^2 V_{\delta_p} C_h$$

in which:
$M_a$ is the aerodynamic hinge moment;
$\gamma$ is an adiabatic coefficient of the air;
$P_s$ is the external static pressure;
$V_{\delta_p}$ represents a volume of the control surface; and
$C_h$ is the model of hinge moment coefficient, dependent on the Mach number M; and
at least one data transmission unit configured to provide this first speed to at least one user system.

In a first preferred embodiment, the first data generating unit comprises:
at least one measurement element configured to measure at least one pressure difference between the hydraulic chambers of at least one actuator intended to generate the deflection of the control surface; and
a computation element configured to compute the aerodynamic hinge moment, with the aid at least of this pressure difference.

Furthermore, in a second simplified embodiment, the first data generating unit comprises at least one measurement element configured to directly measure the aerodynamic hinge moment on the control surface.

The present disclosure also relates to an aircraft, in particular a transport airplane, which is provided with a device such as that specified hereinabove.

BRIEF DESCRIPTION OF THE DRAWINGS

The appended figures will elucidate the manner in which the disclosure herein may be embodied. In these figures, identical references designate similar elements.

DETAILED DESCRIPTION

Figure 1:
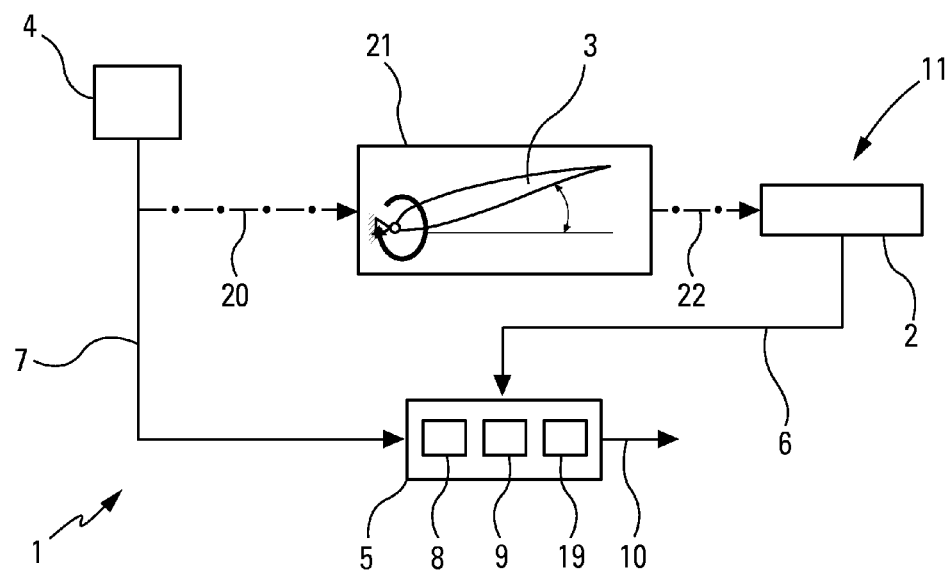
FIG. 1 is the schematic diagram of a device for estimating a speed of an aircraft.

The device 1 represented schematically in FIG. 1 and making it possible to illustrate the disclosure herein, is a device intended in particular to estimate automatically, in real time, at least one speed of an aircraft (not represented), in particular of a transport airplane, during a flight of the latter.

According to the disclosure herein, the device 1 which is onboard the aircraft, comprises, as represented in particular in FIG. 1:
a data generating unit 2 configured to determine at least one aerodynamic hinge moment of at least one control surface 3 of the aircraft;
a data generating unit 4 configured to determine, in a standard manner, a plurality of data and at least the following data:
a static pressure external to the aircraft; and
a model of hinge moment coefficient; and
a central unit (or computation unit) 5 which is connected by way of links 6 and 7 respectively to the units 2 and 4 and which comprises at least one computation element 8 for computing a Mach number M representing a first speed of the aircraft, with the aid of the following expression:

$$M_a = \frac{1}{2}\gamma P_s M^2 V_{\delta_p} C_h$$

in which:
$M_a$ is the aerodynamic hinge moment, received from the unit 2;
$\gamma$ is the adiabatic coefficient of the air, for example recorded in a memory 9 of the central unit 5;
$P_s$ is the external static pressure, received from the unit 4;
$V_{\delta_p}$ represents a volume of the control surface 3, for example recorded in the memory 9 of the central unit 5; and
$C_h$ is the model of (aerodynamic) hinge moment coefficient, dependent on the Mach number M; and
at least one data transmission unit (link 10) which provides the first speed computed by the central unit 5 to at least one user system (not represented) of the aircraft, for example a computer.

The data generating unit 4 comprises a set of sources of standard data of the aircraft (which are not described further), able to measure or compute, in a standard manner, the data necessary for the implementation of the present disclosure. These data are already present and moreover used for the control of the aircraft.

In a preferred embodiment, at least the central unit 5 of the device 1 is integrated into a computer of a flight control system, of FCS (for "Flight Control System") type, of the aircraft.

Thus, the device 1 estimates automatically, in real time, the speed of the aircraft, on the basis of the value of at least one aerodynamic hinge moment of at least one control surface 3 of the aircraft, without using therefor any measurement of the total air pressure.

The aerodynamic hinge moment $M_a$ (illustrated by an arrow F in FIG. 2) is representative of the aerodynamic forces acting on the control surface 3 of the aircraft in the course of the flight. These forces depend on the speed of the aircraft, and also on a plurality of other parameters, such as for example the aerodynamic configuration of the aircraft, the angle of attack of the aircraft, its flight altitude, etc.

This control surface 3 can correspond to any control surface 3 of the aircraft able to act on the flight of the aircraft and which is subjected to aerodynamic forces dependent in particular on the speed of the aircraft, thereby making it possible to deduce this speed from the aerodynamic hinge moment of this control surface 3. Thus, although not exclusively, this control surface may in particular correspond to any type of control surface: aileron, elevator, spoiler, rudder, etc. of the aircraft.

In a standard manner, the deflection of this control surface 3 is generated by one or more actuators 12 which can be of any type, in particular of hydraulic type, of electro-hydrostatic type or of electromechanical type.

Figure 2:
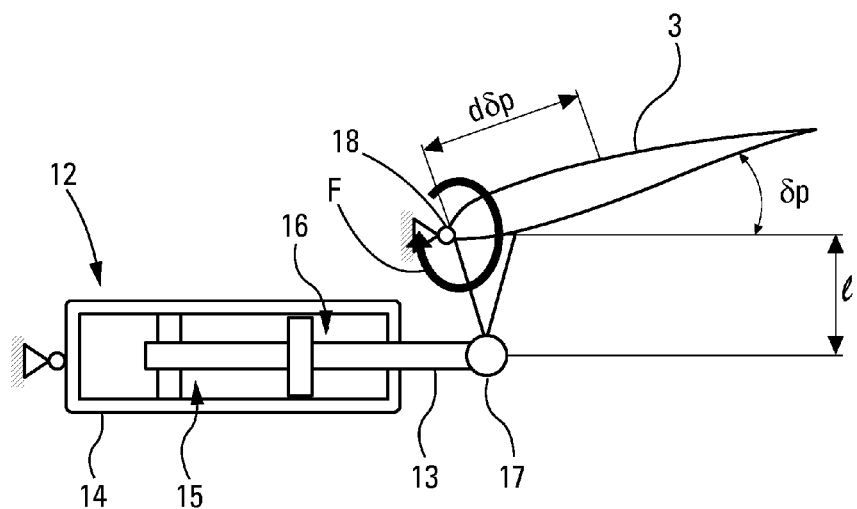
FIG. 2 schematically shows an exemplary control surface and associated actuator, used for the implementation of the present disclosure.

In the example of FIG. 2, the actuator 12 is a hydraulic actuator which comprises, in a standard manner, a movable stem 13, arranged in a cylinder 14 and delimiting two chambers 15 and 16 of volumes which vary in the course of the displacement of the stem 13. The displacement of the stem 13 which is tied by a hinge element 17 to the control surface 3 generates a deflection of the control surface 3, in the form of a rotation about an axis 18 integral with a support. The embodiment and manner of operation of the actuator/surface system formed of the control surface 3 and of the actuator 12 are implemented in a standard manner and are not further described in the following description.

In a particular embodiment, the central unit 5 also comprises a computation element 19 for computing a conventional speed (or corrected speed) CAS, representing a second speed of the aircraft. The computation element 19 computes the speed CAS on the basis of the Mach number M computed by the computation element 8, by using the following expression:

$$CAS = \sqrt{\frac{2}{\gamma-1}} \sqrt{\gamma R T_0} \sqrt{\left\{\frac{P_s}{P_0}\left[\left(1+\frac{\gamma-1}{2}M^2\right)^{\frac{\gamma}{\gamma-1}}-1\right]+1\right\}^{\frac{\gamma}{\gamma-1}}-1}$$

in which, in addition to the aforementioned parameters:
R is the specific constant of the air;
$T_0$ is the temperature at sea level; and
$P_{s_0}$ is the static pressure at sea level;
$P_s$ is the external static pressure.

Moreover, this conventional speed CAS computed by the computation element 19 can also be transmitted, via the link 10, to at least one user system (not represented) of the aircraft, for example to a computer.

In a preferred embodiment, the device 1 comprises a set 11 of units 2 for determining aerodynamic hinge moments of a plurality of different control surfaces 3 of the aircraft, and the central unit 5 computes the Mach number (and optionally the conventional speed) with the aid of the aerodynamic hinge moments relating to this plurality of control surfaces 3.

Figure 3:
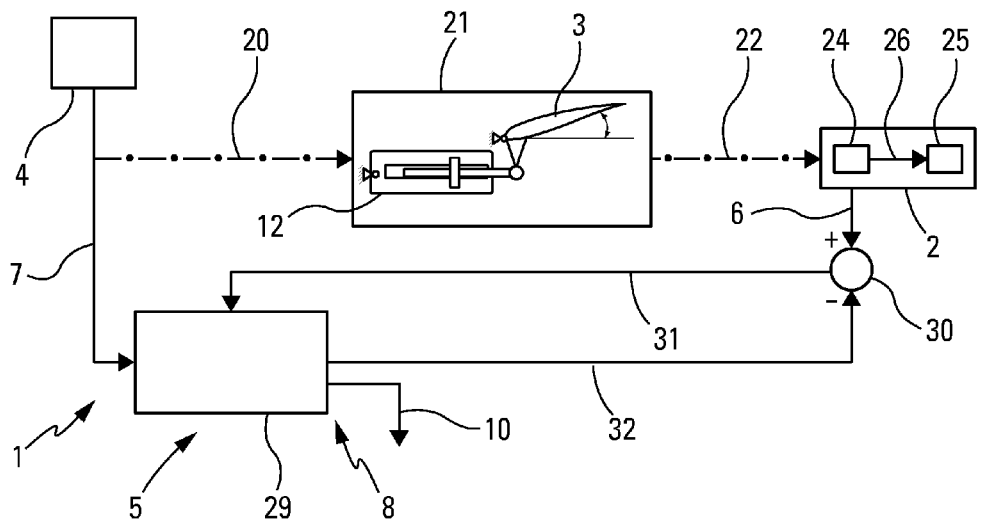
FIG. 3 is the schematic diagram of a first embodiment of an estimation device in accordance with the disclosure herein.
Figure 4:
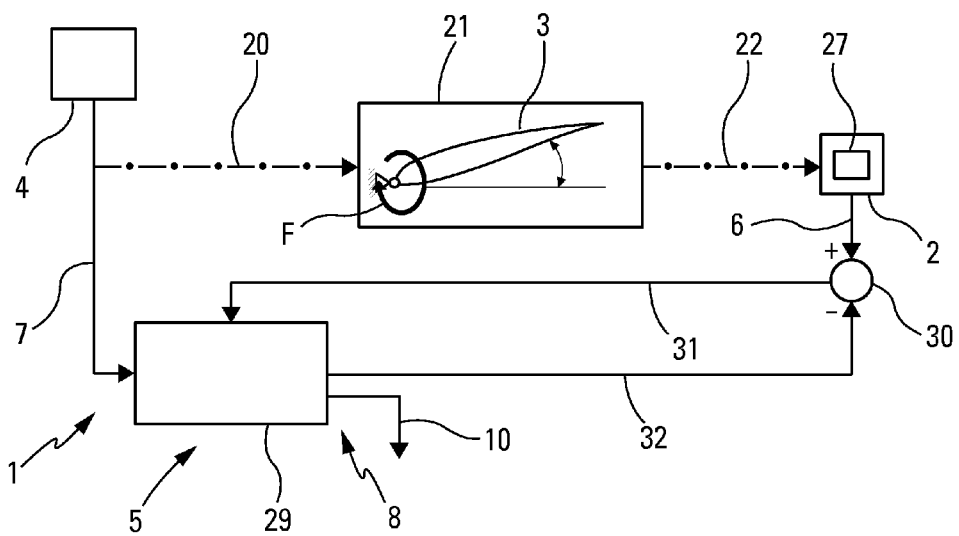
FIG. 4 is the schematic diagram of a second embodiment of an estimation device in accordance with the disclosure herein.
Figure 5:
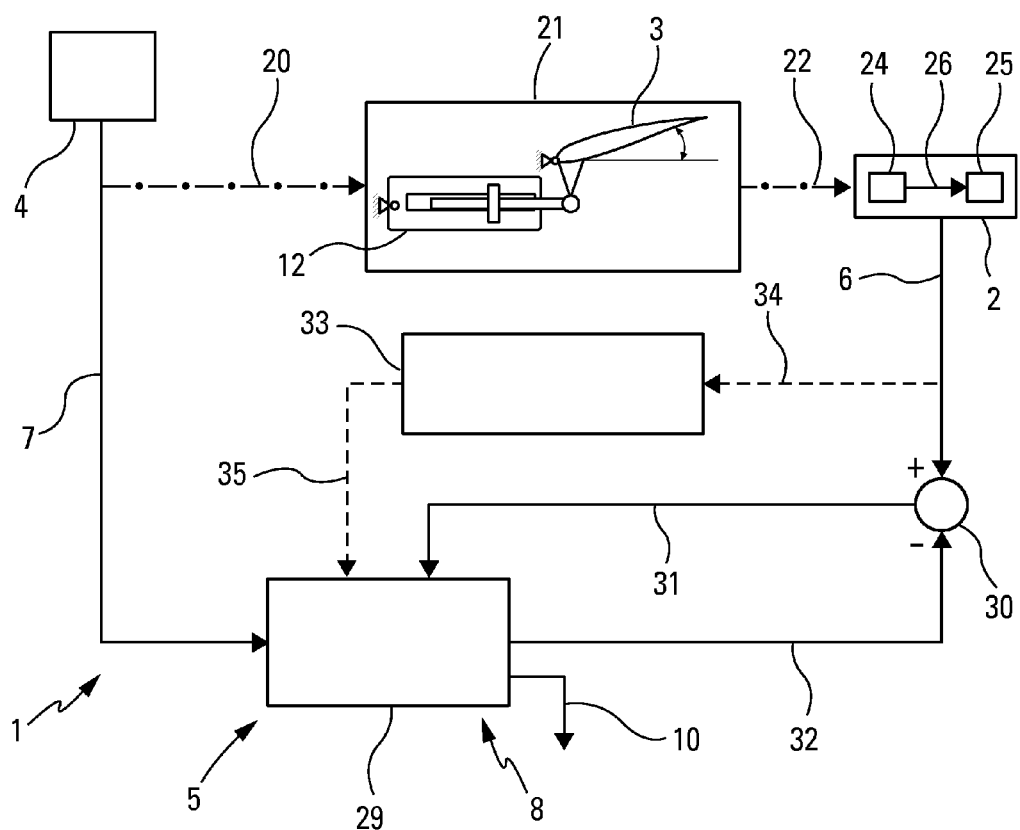
FIG. 5 is the schematic diagram of a variant embodiment of an estimation device.

To illustrate the principle of the disclosure herein, a model 21 has been represented, in a schematic manner in FIGS. 3 to 5, illustrating the control surface 3 to which are applied (as illustrated by a chain-dotted link 20) input parameters, at least some of which are those determined by the unit 4, and with respect to which are measured, by the unit 2, as illustrated by a chain-dotted link 22, parameters.

The device 1 can be embodied according to two different embodiments, namely:
a first embodiment represented in FIG. 3, which implements an indirect determination of the aerodynamic hinge moment $M_a$; and
a second embodiment represented in FIG. 4, which carries out and uses a direct measurement of the aerodynamic hinge moment $M_a$.

In the first preferred embodiment, represented in FIG. 3, the data generating unit 2 comprises:
a measurement element (or sensor) 24 for measuring at least one pressure difference between the hydraulic chambers 15 and 16 (FIG. 2) of at least one actuator 12 intended to generate the deflection of the control surface 3; and
a computation element 25 configured to compute the aerodynamic hinge moment, with the aid at least of this pressure difference (received via a link 26).

This first embodiment utilizes an indirect determination of the aerodynamic hinge moment $M_a$, by using systems already existing on the aircraft (that is to say by using at least one non-dedicated sensor (measurement element 24) to estimate the aerodynamic hinge moment $M_a$).

For each control surface 3, the measured differential pressures between the two hydraulic chambers 15 and 16 of the actuator or actuators 12 generating the deflection of the control surface 3, are directly related to the aerodynamic forces generated by the hydraulic actuators 12 through the following physical equation:

$$J_{\delta_p}\ddot{\delta}_p = M_{in} + M_a + \sum_{i=1}^{n}(\Delta PSl)_i + F_j l$$

in which:
n represents the number of actuators 12 acting on the control surface 3;
$(\Delta PSl)_i$ represents the moment induced by the i-th actuator;
$\Delta P$ represents the differential pressure within the i-th actuator;
S represents the surface area of the stem 13 of the actuator 12;
l represents the lever arm of the actuator 12, as represented in FIG. 2;
$M_{in}$ represents the moment due to the mass properties of the control surface 3;
$F_j l$ represents the moment due to friction;
$J_{\delta_p}$ represents the inertia of the control surface 3; and
$\delta_p$ is the angle of deflection of the control surface 3, also as represented in FIG. 2.

In particular, the moment $M_{in}$ due to the mass properties of the control surface 3, satisfies the following equation:

$$M_{in}=(n_z \cos \delta_p\, n_x \sin \delta_p)+d_{\delta_p}m_{\delta_p}g_0$$

in which:
$n_x$ and $n_z$ are the load factors along x and z axes, which are orthogonal to the articulation axis;
$d_{\delta_p}$ indicates the arm of the center of gravity of the control surface 3, as represented in FIG. 2;
$m_{\delta_p}$ represents the mass of the control surface 3; and
$g_0$ represents the acceleration due to gravity.

The following aerodynamic moment $M_a$ is obtained:

$$M_a = \frac{1}{2}\gamma P_s M^2 V_{\delta_p} C_h(M, \ldots)$$

This expression is used by the computation element 8 to extract the Mach number M.

This first embodiment makes it possible to estimate the speed (Mach number M and/or conventional speed CAS) of the aircraft, by using information from a device(s) (measurement element 24 in particular) already present on the aircraft, and therefore makes it possible to estimate the speed of the aircraft without any additional sensor, that is to say without any additional cost, or additional mass.

Moreover, in a second embodiment represented in FIG. 4, the data generating unit 2 comprises at least one measurement element 27, able to directly measure the aerodynamic hinge moment $M_a$ on the control surface 3.

This second embodiment therefore takes into account a direct measurement of the aerodynamic hinge moment, for example by using one or more dedicated sensors (or measurement element 27).

In all the embodiments, the central unit 5 extracts the Mach number M from the following equation:

$$M_a = \frac{1}{2}\gamma P_s M^2 V_{\delta_p} C_h(M, \alpha_{AC}, \beta_{AC}, \delta_p, p, q, r, conf, \ldots)$$

in which, in addition to the aforementioned parameters:
$\alpha_{AC}$ is the angle of attack of the aircraft;
$\beta_{AC}$ is the angle of sideslip of the aircraft;
conf represents the aerodynamic configuration of the aircraft, depending in a standard manner on the position of the lift-enhancing devices (leading edge or trailing edge devices, also called slats and flaps); and
p, q, and r are the angular velocities of the aircraft, respectively in roll, pitch and yaw.

These last parameters are received from the unit 4.

The computations implemented by the central unit 5 to compute the Mach number are specified hereinafter.

These computations can be carried out according to various computation variants.

Computations implemented for the first embodiment of FIG. 3 (relating to an indirect determination of the aerodynamic hinge moment) are specified firstly, by using an actuator system/surface model.

The mathematical relation which links the Mach number to the available measurements is called the output function. Generally, it is possible to group the computation variants (implemented by the central unit 5) in two categories, based on the type of output function used:
a first category contains invertible output functions which permit model inversion; and
a second category contains non-invertible output functions which do not permit model inversion.

The second category is preferred, because of the complexity of the relation which links the Mach number and the aerodynamic moments, which illustrate the available output functions. This is due in part to the nonlinear structure of the model $C_h$.

In a preferred embodiment, to increase the precision of the estimation, the unit 4 determines the following additional parameters, which are thereafter used by the central unit 5 to compute the Mach number:
the aerodynamic angles $\alpha_{AC}$ and $\beta_{AC}$ of the aircraft;
the angle of deflection $\delta_p$ of the control surfaces 3;
the load factors $n_x$ and $n_z$ of the control surfaces 3;
the aerodynamic configuration conf of the aircraft (representative of the position of the slats and of the flaps of the aircraft); and
the angular velocities p, q, and r of the aircraft, in roll, pitch and yaw.

The model used to estimate the Mach number is represented by the following very general state space system:

$$\begin{bmatrix} J_{\delta_p}\dot{\omega}_p \\ \delta_p \end{bmatrix} = \begin{bmatrix} M_{in}(n_x, n_z, \delta_p) + \\ M_a(P_s, M, \alpha_{AC}, \beta_{AC}, p, q, r, \delta_p, conf) + \sum_{i=1}^{nj}(\Delta PSl)_i \\ \omega_p \end{bmatrix}$$

The term $\omega_p$ is the first-order derivative of $\delta_p$ and represents the angular velocity of the control surface 3. The term $J_{\delta_p}$ is the moment of inertia of the control surface 3.

Generally, the following procedure is provided:
a) model the Mach number as an exogenous dynamic system, that is to say define $\dot{M}=f(t)$. The term f(t) represents an unknown time function, but limited by real values;
b) add the Mach number as an additional state variable, namely:

$$\begin{bmatrix} \dot{M} \\ \dot{\omega}_p \\ \dot{\delta}_p \end{bmatrix} = \begin{bmatrix} f(t) \\ \frac{1}{J_{\delta_p}}\left\{ \begin{array}{l} M_{in}(n_x, n_z, \delta_p) + \\ M_a(P_s, M, \alpha_{AC}, \beta_{AC}, p, q, r, \delta_p, conf) + \sum_{i=1}^{nj}(\Delta PSl)_i \end{array} \right\} \\ \omega_p \end{bmatrix}$$

c) design an estimation observer for the state $x=[M, \omega_p, \delta_p]^T$.

$\delta_p$ can be computed on the basis of the knowledge of the position $R_p$ of the stem 13 of the actuator 12 and of a kinematic chain model.

The need for a simple algorithm, with a reasonable computational load, has led to the formulation of an approximate solution for the static flight phases. In these aircraft flight phases, a static version is provided:

$$\dot{M} = f(t)$$

$$y = M_a = -M_{in} - \sum_{i=1}^{nj}(\Delta PSl)_i$$

It is considered that, on the aircraft, the number of actuator/surface systems is equal to n, and we select k of these systems with $1 \le k \le n$. The following algorithm utilizes the selected systems:

$$\frac{d\hat{M}}{dt} = \left[\left(\frac{\partial H}{\partial M}\right)^T \left(\frac{\partial H}{\partial M}\right)\right]_{M=\hat{M}}^{-1} \left(\frac{\partial H}{\partial M}\right)_{M=\hat{M}}^T \operatorname{diag}(m_1(\hat{M}), \ldots, m_k(\hat{M}))V$$

where $$V = \begin{bmatrix} \operatorname{sign}(y_1 - h_1(\hat{M})) \\ \ldots \\ \operatorname{sign}(y_k - h_k(\hat{M})) \end{bmatrix}$$

and $$H(M) = \begin{bmatrix} y_1 \\ \ldots \\ y_k \end{bmatrix} = \begin{bmatrix} h_1(M) \\ \ldots \\ h_k(M) \end{bmatrix} = \begin{bmatrix} M_{a_1}(M) \\ \ldots \\ M_{a_k}(M) \end{bmatrix} \begin{bmatrix} M_{a_1}(M) \\ \ldots \\ M_{a_k}(M) \end{bmatrix}$$

where $n_j$ with $j \in \{1, \ldots, n\}$ represents the number of actuators 12 installed on the j-th control surface 3. Even though the parameters $m_j$ with $1 \le j \le k$ can be determined in various ways, the following relation guarantees a fixed Mach estimate convergence rate:

$$m_j = K\max(|\dot{M}|)\left|\frac{\partial h_j}{\partial M}(\hat{M})\right|$$

with $K > 1$

Consequently, only a single parameter has to be determined, namely K. This algorithm (implemented by the computation element 8) can be applied to a single actuator 12 or to a plurality of actuators 12, doing so as far as all the $$\sum_{i=1}^{n} n_j$$

actuators 12 which are present.

The algorithm is called the Least Squares-Sliding Mode (LS-SM) observer.

The structure of the algorithm in the case of a single actuator/surface system, namely k=1, is:

$$\frac{d\hat{M}}{dt} = K\max(|\dot{M}|)\text{sign}\left(\frac{\partial h_j}{\partial M}(\hat{M})\right)\text{sign}(y_j - h_j(\hat{M}))$$

More precisely, to implement the computation, the computation element 8 of the central unit 5 comprises, as represented in FIG. 3:
 a computation element 29 comprising the observer such as described hereinabove, which receives data from the unit 4 via the link 7 and from a computation element 30 (which computes a difference of received data) via a link 31; this computation element 29 estimates the Mach number that it transmits via the link 10; and
 the computation element 30 which receives the parameters $$\sum_{i=1}^{nj} (\Delta PSI)_i$$

from the unit 2 and the parameters $h_j(\hat{M})$ from the computation element 29 (via a link 32).

The aircraft's flight computers work in discrete time. The algorithm must therefore be rendered discrete in order to be able to be implemented by the central unit 5 embedded in a computer of the aircraft. With $T_S$ the sampling time and r an index representing a sampling instant, the generic algorithm, in its discrete temporal form, for k actuators 12, is as follows:

$$\hat{M}(r+1) = \hat{M}(r) + T_s K\max(|\dot{M}|)\sum_{j=1}^{k}\text{sign}\left(\frac{\partial h_j}{\partial M}(\hat{M}(r))\right)\text{sign}(y_j(r) - h_j(\hat{M}(r)))$$

By way of illustration, the estimator can be applied to a horizontal "actuator/surface" system, during a so-called static flight, for which:
 the angular rates are negligible;
 the load factors are constant;
 the deflection of the control surface is constant;
 weak aerodynamic angular variations do not involve any significant modification of the aerodynamic hinge moment; and
 the aerodynamic configuration is fixed and known.

Under these flight conditions, the aerodynamic hinge moment is a function of the Mach number (simple independent variable). The only strictly necessary information is then:
 the aerodynamic hinge moment $M_a$;
 the external static pressure $P_s$; and
 the model of hinge moment coefficient $C_h$.

The computation scheme used by the second embodiment (direct measurement of the aerodynamic hinge moments) of FIG. 4 is similar to that described hereinabove for the first embodiment of FIG. 3.

The embodiment of FIG. 4 is similar to that of FIG. 3. However, the unit 2 transmits parameters $M_{a_j}$ to the computation element 30 via the link 6.

If the number of "surface" systems is n and if we select k of these systems, with $1 \leq k \leq n$, the following algorithm utilizes the k selected systems:

$$\frac{d\hat{M}}{dt} = \left[\left(\frac{\partial H}{\partial M}\right)^T\left(\frac{\partial H}{\partial M}\right)\right]_{M=\hat{M}}^{-1}\left(\frac{\partial H}{\partial M}\right)^T_{M=\hat{M}}\text{diag}(m_1(\hat{M}), \ldots, m_k(\hat{M}))V$$

$$\text{where } V = \begin{bmatrix} \text{sign}(y_1 - h_1(\hat{M})) \\ \cdots \\ \text{sign}(y_k - h_k(\hat{M})) \end{bmatrix}$$

$$H(M) = \begin{bmatrix} y_1 \\ \cdots \\ y_k \end{bmatrix} = \begin{bmatrix} h_1(M) \\ \cdots \\ h_k(M) \end{bmatrix} = \begin{bmatrix} M_{a_1}(M) \\ \cdots \\ M_{a_k}(M) \end{bmatrix}$$

Even though the parameters $m_j$, with $1 \leq j \leq k$, can be defined in various ways, the following equation guarantees a fixed Mach estimate convergence rate:

$$m_j = K\max(|\dot{M}|)\left|\frac{\partial h_j}{\partial M}(\hat{M})\right| \text{ with } K > 1$$

In conclusion, only a single parameter has to be determined, namely K. This algorithm (implemented by the computation element 8) can be applied to a single surface 3 or to a plurality of surfaces 3, doing so as far as all the $$\sum_{j=1}^{n} n_j$$

surfaces 3 which are present.

The aircraft's flight computers working in discrete time, this algorithm must therefore be rendered discrete in order to be able to be implemented by the central unit 5 embedded in a computer of the aircraft. With $T_S$ the sampling time and r an index representing a sampling instant, the generic algorithm, in its discrete temporal form, for k actuators, is as follows:

$$\hat{M}(r+1) + \hat{M}(r) + T_s K max(|\dot{M}|)\sum_{j=1}^{k}\text{sign}\left(\frac{\partial h_j}{\partial M}(\hat{M}(r))\right)\text{sign}(y_j(r) - h_j(\hat{M}(r)))$$

In addition to the LS-SM algorithm, two categories of solutions:
- those which utilize a model inversion; and
- those which do not utilize a model inversion, may also be applied to the two embodiments (FIGS. 3 and 4).

Three different modes of computation are presented hereinafter.

According to a first mode of computation (least squares), if $M^2 C_h(M, \ldots)$ is an easily invertible function of the Mach number, it is possible to invert the relation and to estimate the Mach number algebraically. By way of example, for low Mach numbers, the hinge moment coefficient is not dependent on the Mach; it is therefore possible to use the following relation:

$$y = \sum_{i=1}^{n_j} (\Delta PSl)_{ij} - M_{in_j} = M_{a_j} = M^2 \frac{1}{2} \gamma P_s C_{h_j} \text{ with } 1 \le j \le k.$$

By considering k surfaces, we end up with a conventional "Least Squares" algorithm:

$$\hat{M}^2 = (H^T H)^{-1} H^T Y$$

where $H = \frac{1}{2} \gamma P_s \begin{bmatrix} C_{h_1} \\ \cdots \\ C_{h_k} \end{bmatrix}$ and $Y = \begin{bmatrix} \sum_{i=1}^{n1} (\Delta PSl)_{i1} - M_{in_1} \\ \cdots \\ \sum_{i=1}^{nk} (\Delta PSl)_{ik} - M_{in_k} \end{bmatrix} = \begin{bmatrix} M_{a_1} \\ \cdots \\ M_{a_k} \end{bmatrix}$ Moreover, according to a second mode of computation which is applicable to both embodiments (FIGS. 3 and 4), the state estimator has a simpler structure than that of the aforementioned LS-SM estimator. Moreover, the convergence is only asymptotic, and thus the convergence time is infinite. The main structure of the algorithm corresponds to the structure of the LS-SM estimator with a sole difference in the return signal V, which is:

$$V = \begin{bmatrix} y_1 - h_1(\hat{M}) \\ \cdots \\ y_k - h_k(\hat{M}) \end{bmatrix}$$

In this case also, the algorithm (implemented by the computation element 8) can be applied to a single actuator 12 or to a plurality of actuators 12, doing so as far as all the $$\sum_{j=1}^{n} n_j$$

actuators 12 which are present.

This algorithm is called the "Least Squares-Luenberger" observer.

Moreover, according to a third mode of computation, the estimator utilizes the concept of fast and slow dynamics. The dynamics of the control surfaces 3 faster than that of the aircraft. Hence, the values $M, \alpha_{AC}, \beta_{AC}, n_x, n_z, p, q, r, conf$ can be considered to be constant during the fast movements of the control surfaces 3.

As the estimator is strictly tied to the actuator/surface system, this third mode of computation is valid only for the aforementioned first embodiment (FIG. 3).

The embodiment of FIG. 5 is able to implement this third mode of computation. Accordingly, the computation element 8 of the central unit 5 comprises, with respect to that of FIG. 3, additionally, an estimator 33 which is connected by way of a link 34 to the link 6 and by way of a link 35 to the computation element 29 and which carries out a high-order sliding mode estimation.

Each design of an estimator begins with the definition of the oriented model, that is to say of the model in which the inputs and the outputs have been defined. $\Delta P$ is identified as the simple variable time input. The output is the position $\delta_p$ of the control surface 3 or the position $R_p$ of the stem 13 of the actuator 12, tied to the position $\delta_p$ by kinematic equations.

As the function $C_h(M, \ldots)$ may be nonlinear in the variable M, a nonlinear state observer constitutes the best approach for solving the problem. The need to guarantee a finite convergence time, associated with the need for a simple estimator design procedure, leads to the choice of a "nonlinear sliding mode" state observer. The following equations define the structure of the observer:

$$\frac{d\hat{x}}{dt} = \left[\frac{\partial H}{\partial x}(\hat{x})\right]^{-1} W(\hat{x}) \text{sign}[V - H(\hat{x})] + \Delta P(t) Sl(\hat{\delta}_p)$$

where $\hat{x} = [\hat{M} \; \hat{\omega}_p \; \hat{\delta}_p]^T$ is the estimated state vector.

$$H = \begin{pmatrix} \delta_p \\ \omega_p \\ L_n^2 h \end{pmatrix} = \begin{pmatrix} \delta_p \\ \omega_p \\ \frac{1}{J_{\delta_p}} \{M_i(n_x, n_z, \delta_p) + M_a(P_s, M, \ldots)\} \end{pmatrix}$$

$$W(\hat{x}) = \begin{bmatrix} m_1(\hat{x}) & 0 & 0 \\ 0 & m_2(\hat{x}) & 0 \\ 0 & 0 & m_3(\hat{x}) \end{bmatrix}$$

is a mass matrix.

The terms $\{.\}_{eq}$ are the equivalent signals on the "sliding" surface. They represent the mean value of the "sliding" surface. For example, the first "sliding" surface is $s = \delta_p(t) - \hat{\delta}_p = 0$ and $$\dot{s} = \omega_p(t) - \frac{d}{dt} \hat{\delta}_p = \omega_p(t) - m_1(\hat{x}) \text{sign}(V_1 - \hat{\delta}_p),$$

and in order to remain on the "sliding" surface, we must have $\dot{s} = 0$, hence implying that $\omega_p(t) = m_1(\hat{x}) \text{sign}(V_1 - \hat{\delta}_p)$. Thus, the equivalent term is $\{m_1(\hat{x}) \text{sign}(V_1 - \hat{\delta}_p)\}_{eq} = \omega_p(t)$.

One way of obtaining the equivalent signal is a low-pass filter:

$$\{\dot{u}\}_{eq} + \lambda \{u\}_{eq} = u$$

This solution is easy to implement, but generates phase delays. This is why an estimator with high-order derivative (estimator 33) is used for the estimation of the signals:

$$\{m_1(\hat{x})\text{sign}(V_1-\hat{\delta}_p)\}_{eq}=z_1$$

$$\{m_2(\hat{x})\text{sign}(V_2\hat{\omega}_p)\}_{eq}=z_2$$

Starting from the available output $y_{\delta_p}=\delta_p$, the following high-order sliding mode observer estimates its first two derivatives $\omega_p$ and $\dot{\omega}_p$.

$$\dot{z}_0=v_0$$

$$v_0=-\lambda_0|z_0-y|^{2/3}\text{sign}(z_0-y)+z_1$$

$$\dot{z}_1=v_1$$

$$v_1=-\lambda_1|z_1-v_0|^{1/2}\text{sign}(z_1-v_0)+z_2$$

$$\dot{z}_2=\lambda_2\,\text{sign}(z_2-v_1)$$

with $$\begin{cases}\hat{\delta}_p=z_0\\ \hat{\omega}_p=z_1\\ \hat{\dot{\omega}}_p=z_2\end{cases}$$

Finally, the matrix $W(\hat{x})$ can be obtained by knowing the limits of the signals $\delta_p(t)$, $\omega_p(t)$, and $\dot{\omega}_p(t)$. To guarantee the stability of the observer, it is sufficient to satisfy the following conditions:

$$\begin{cases}m_1(\hat{x})>|\omega_p|\\ m_2(\hat{x})>|\dot{\omega}_p|\\ m_3(\hat{x})>\left|\frac{d}{dt}L_n^2h\right|\end{cases}$$

The subject matter disclosed herein can be implemented in software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for automatically estimating at least one speed of an aircraft during flight, without using a measurement of total air pressure, the method comprising:
   a) determining at least one aerodynamic hinge moment of at least one control surface of the aircraft using an existing control surface actuator or sensor onboard the aircraft;
   b) determining at least the following data from the existing control surface actuator or sensor:
      a static pressure external to the aircraft; and
      a model of hinge moment coefficient;
   c) computing a first speed of the aircraft; and
   d) providing the first speed to at least one user system automatically in real time,
   wherein step c) comprises computing a Mach number M representing a first speed of the aircraft, based on a relationship between the Mach number and the determined aerodynamic hinge moment in the following expression:

$$M_a=\frac{1}{2}\gamma P_s M^2 V_{\delta_p} C_h$$

in which:
   $M_a$ is the determined aerodynamic hinge moment;
   $\gamma$ is an adiabatic coefficient of the air;
   $P_s$ is an external static pressure;
   $V_{\delta_p}$ represents a volume of the control surface; and
   $C_h$ is the model of hinge moment coefficient, dependent on the Mach number M.

2. The method of claim 1, wherein step a) comprises sub-steps of:
   measuring at least one pressure difference between two hydraulic chambers of at least one actuator intended to generate deflection of the control surface; and
   computing the aerodynamic hinge moment, using at least the pressure difference.

3. The method of claim 1, wherein step a) comprises a sub-step of directly measuring the aerodynamic hinge moment on the control surface using sources of standard data of the aircraft.

4. The method of claim 1, wherein step c) uses a model inversion for the model of the aerodynamic hinge moment.

5. The method of claim 4, wherein step c) implements a least squares scheme.

6. The method of claim 1, wherein step c) uses a non-invertible function, for the model of the aerodynamic hinge moment.

7. The method of claim 6, wherein step c) implements one of the following schemes:
   a scheme using a "Least-Squares Sliding-Mode" observer;
   a scheme using a "Least-Squares Luenberger" observer; and
   a scheme using a "High Order Sliding-Mode" observer.

8. The method of claim 1, wherein step b) comprises also determining at least some of the following data which are used in step c) to compute the Mach number:
at least one aerodynamic angle of the aircraft;
an angle of deflection of the at least one control surface;
at least one load factor of the control surface;
the aerodynamic configuration of the aircraft; and
at least one angular velocity of the aircraft.

9. The method of claim 1, wherein step a) comprises determining aerodynamic hinge moments of a plurality of different control surfaces of the aircraft, and wherein step c) comprises computing the Mach number using the aerodynamic hinge moments relating to the plurality of control surfaces.

10. The method of claim 1, which further comprises an additional step after step c), comprising computing a conventional speed representing a second speed of the aircraft, on the basis of the Mach number computed in step c) and of additional data.

11. The method of claim 1, wherein the at least one control surface comprises at least one of an aileron, an elevator, a spoiler, a rudder, a leading edge device, and a trailing edge device.

12. A system for automatically estimating at least one speed of an aircraft during flight, without using a measurement of total air pressure, the system comprising:
a first control surface actuator or sensor of the aircraft configured to determine at least one aerodynamic hinge moment of at least one control surface of the aircraft;
a second source of standard aircraft data configured to determine at least the following data:
a static pressure external to the aircraft; and
a model of hinge moment coefficient;
computer processor configured to compute a first speed; and
at least one data transmitter configured to transmit the first speed to at least one user system,
wherein the computer processor is configured to compute a Mach number M representing a first speed of the aircraft, based on a relationship between the Mach number and the aerodynamic hinge moment in the following expression:

$$M_a = \frac{1}{2}\gamma P_s M^2 V_{\delta_p} C_h$$

in which:
$M_a$ is the aerodynamic hinge moment;
$\gamma$ is an adiabatic coefficient of the air;
$P_s$ is an external static pressure;
$V_{\delta_p}$ represents a volume of the control surface; and
$C_h$ is the model of hinge moment coefficient, dependent on the Mach number M.

13. The system of claim 12, wherein the first control surface actuator or sensor comprises:
at least one measurement element configured to measure at least one pressure difference between hydraulic chambers of at least one actuator intended to generate deflection of the control surface; and
a computation element configured to compute the aerodynamic hinge moment, using at least the pressure difference.

14. The system of claim 12, wherein the first control surface actuator or sensor comprises at least one measurement element configured to directly measure the aerodynamic hinge moment on the control surface.

15. An aircraft comprising a system according to claim 12.

16. The system of claim 12, wherein the at least one control surface comprises at least one of an aileron, an elevator, a spoiler, a rudder, a slat, and a flap.

* * * * *